(12) United States Patent
Wang

(10) Patent No.: US 8,419,408 B2
(45) Date of Patent: Apr. 16, 2013

(54) EXTRUSION MOLD FOR NON-PNEUMATIC MULTI-HOLE HOLLOW TIRE

(76) Inventor: Mingjiang Wang, Pizhou (CN)

( * ) Notice: Subject to any disclaimer, the term of this patent is extended or adjusted under 35 U.S.C. 154(b) by 396 days.

(21) Appl. No.: 11/912,421

(22) PCT Filed: Apr. 12, 2006

(86) PCT No.: PCT/CN2006/000657
§ 371 (c)(1),
(2), (4) Date: Oct. 24, 2007

(87) PCT Pub. No.: WO2006/114041
PCT Pub. Date: Nov. 2, 2006

(65) Prior Publication Data
US 2008/0193578 A1 Aug. 14, 2008

(30) Foreign Application Priority Data
Apr. 26, 2005 (CN) .......................... 2005 1 0039108

(51) Int. Cl.
*B29C 47/20* (2006.01)
(52) U.S. Cl.
USPC ......... 425/192 R; 425/380; 425/461; 425/467
(58) Field of Classification Search ............... 425/192 R, 425/380, 461, 467; 264/177.12
See application file for complete search history.

(56) References Cited

U.S. PATENT DOCUMENTS

| | | | | |
|---|---|---|---|---|
| 1,152,978 A | * | 9/1915 | Royle | 425/192 R |
| 1,725,959 A | * | 8/1929 | Heath | 425/467 |
| 2,705,669 A | * | 4/1955 | Leston | 264/338 |
| 2,952,871 A | * | 9/1960 | Loeser | 425/380 |
| 3,549,737 A | * | 12/1970 | Schulze | 264/82 |
| 4,298,564 A | * | 11/1981 | Higuchi et al. | 264/177.12 |
| 5,807,590 A | * | 9/1998 | Ishikawa et al. | 425/190 |

* cited by examiner

*Primary Examiner* — Yogendra Gupta
*Assistant Examiner* — Joseph Leyson
(74) *Attorney, Agent, or Firm* — Global IP Services; Tianhua Gu

(57) ABSTRACT

The invention discloses an extrusion mold for non-pneumatic multi-hole hollow tires, which can be used for producing the hollow tires which are non-pneumatic, highly elastic and materials-saving and is characterized by consisting of the mold frame (1) and the mold core (2), with one end of the mold frame (1) connected with the extruder's feeder and the other end connected with the mold core (2); inside the mold frame (1) is provided a feeding via (3), one end of which communicates with the feed inlet of the extruder's feeder and the other end communicates with the discharge hole (4) of the mold core (2); the discharge hole (4) is provided with several mold blocks (5), which match the shape of the hollow holes in the tires and are directly or indirectly connected with the wall of the discharge hole (4) through a thin-wall connection strap (6).

5 Claims, 1 Drawing Sheet

EXTRUSION MOLD FOR NON-PNEUMATIC MULTI-HOLE HOLLOW TIRE

CROSS REFERENCE TO THE RELATED PATENT APPLICATION

This patent application is the National Stage of PCT/CN2006/000657, filed on Apr. 12, 2006, which claims foreign priority to Chinese patent application No. 200510039108.2, filed on Apr. 26, 2005.

FIELD OF THE INVENTION

The invention relates to a rubber extrusion mold, particularly an extrusion mold for non-pneumatic multi-hole hollow tires.

BACKGROUND OF THE INVENTION

Currently, there are mainly three types of tires. One type of the tires includes the inner tube, which is charged, and the cover tire. This kind of structure is the most common but the shortcoming is that usually the inner tube can no longer be used once pricked in use and that they have to be manufactured through two different processes. The second type of tire is single-hole tire without inner tube, such as the tires without inner tube used for cars. This type of tire also needs charging before use and has to be replaced or repaired once pricked. Besides, the installation is so complicated that special tools are needed. And these tires have higher requirements of the wheel hubs. The third of tires is solid. Although they are not vulnerable to pricking, they are not elastic in use and need many materials. Therefore, it is a pressing task to produce a kind of non-pneumatic multi-hole hollow tires which can save materials and are elastic and not vulnerable to pricking. What matters is that appropriate rubber extrusion mold is not available.

SUMMARY OF THE INVENTION

The invention aims to provide an extrusion mold for non-pneumatic multi-hole hollow tires, which can be used for producing non-pneumatic, highly elastic and materials-saving tires.

The technological plan of the invention is as follows:

An extrusion mold for non-pneumatic multi-hole hollow tires, characterized by consisting of a mold frame 1 and a mold core 2, with one end of the mold frame 1 connected with the feeder of extruder and the other end connected with mold core 2; inside the mold frame 1 is provided a feeding passageway 3, one end of which communicates with the feed inlet of the extruder's feeder and the other end of which communicates with the discharge hole 4 in the mold core 2; the discharge hole 4 is provided with several mold blocks 5, which match the shape of the hollow holes in tires and are directly or indirectly connected with the wall of the discharge hole 4 through a thin-wall connection strap.

The invention has also taken the following technological measures:

The side on which the mold core 2 is connected with the mold frame 1 is provided with a boss 201, which inserts into the feeding passageway 3 of the mold frame 1.

The number of the said mold blocks 5 matching the shape of the hollow holes in tires is not less than 2.

H, the length of the discharge hole 4 shall not be less than 10 mm so that the rubber can be efficiently molded when extruded.

The beneficial effects of the invention are as follows:

1. Appropriate producing molds are provided for the production of the non-pneumatic multi-hole hollow tires, which is favorable for the popularization and mass production of that kind of tires.

2. The structure is simpler and the manufacture is easy. The parts of the extrusion mold are reduced to the greatest extent by increasing the mold blocks, the shape of which is the same as that of the holes molded finally, in the extrusion hole. This is unmatched by the molds of the same kind and completely solves the problem of the difficult location of the mold core of the current extrusion molds.

3. The tires produced according to the invention are characterized in that they are non-pneumatic, safe, reliable and not vulnerable to pricking.

4. Tires bursting accidents on freeways, which serious jeopardize driving safety, will not happen.

5. With many uses, it can be used for the production of different kinds of tires. Tires of many different kinds can be produced by varying the number and shape of the mold blocks.

DETAILED DESCRIPTION OF THE INVENTION

The invention will be further described in conjunction with the drawings and embodiments.

Embodiment 1

Figure 1:
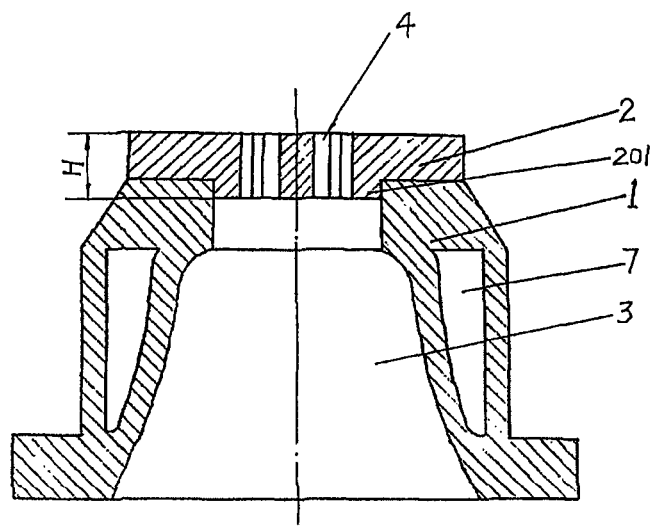
FIG. 1 is the structural schematic view of the invention.
Figure 2:
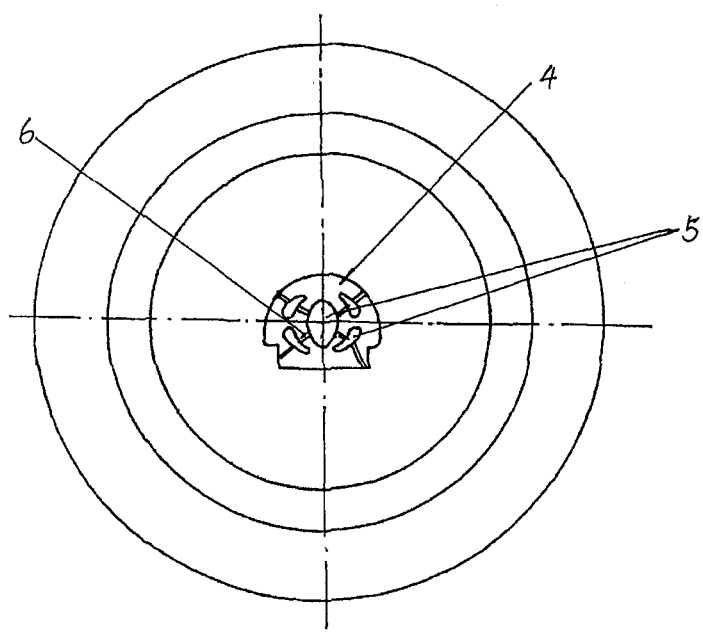
FIG. 2 is the top structural schematic view of FIG. 1.

As Shown in FIG. 1 and FIG. 2

An extrusion mold for non-pneumatic multi-hole hollow tires, only consisting of two parts, mold frame 1 and mold core 2; with the inside of the mold frame 1 provided with a feeding passageway 3 and the mold core 2 provided with a discharge hole 4 which forms hollow hole needed after the rubber passes through; for the purpose of ensuring the molding effects, the height of the discharge hole shall not be less than 10 mm, with one end of the mold frame 1 connected with the extruder's feeder and the other end connected with the mold core 2; the side on which the mold core 2 is connected with the mold frame 1 is provided with a boss 201 (The boss 201 can also be left out in the specific implementation of the invention, i.e., the side on which the mold core 2 is connected with the mold frame 1 is flat), which inserts into the feeding passageway 3 located inside the mold frame 1, with one end of the feeding passageway 3 communicating with the feed inlet of the extruder's feeder and the other end communicating with the discharge hole 4 in the mold core 2; inside the discharge hole 4 are located several mold blocks 5 (There are more than two mold blocks and there are five mold blocks in this embodiment, as shown in FIG. 2), which match the shape of the hollow holes in tires and can either be directly connected with the wall of the discharge hole 4 through a thin-wall connection strap 6 or indirectly connected with the wall of the discharge hole 4 after being interconnected.

Several lightening holes 7 may be made in the mold frame 1 so as to reduce its weight.

The thin-wall connection strap 6 shall be as thin as possible, preferably less than 1-2 mm, so that its thin-strip passageway formed in tires during the process of extrusion molding will automatically disappear during the cooling process after the removal of the rubber out of the mold.

What is claimed is:

1. An extrusion mold for non-pneumatic multi-hole hollow tires comprising:
   a mold core;
   a mold frame, with one end for connecting with an extruder's feeder and other end for connecting with the mold core, the mold frame has a feeding passageway, which communicates a feed inlet of the extruder's feeder at one end and the mold core at other end;
   the mold core consisting of a flat cylinder having one flat discharge hole, flat multi-mold blocks matching the multi-holes in the non-pneumatic multi-hole hollow tire and flat thin-wall connection straps, the multi-mold blocks being connected with a wall of the discharge hole and fixed therein by the flat thin-wall connection straps respectively, the flat discharge hole, flat multi-mold blocks and flat thin-wall connection straps defining a molding hole for molding the non-pneumatic multi-hole hollow tire; thin-strip shaped gaps formed in tire during a process of extrusion molding will be automatically disappear during cooling process after removal of the tire out of the mold;
   the flat mold core is movably fixed on a discharge end of the mold frame.

2. The extrusion mold for non-pneumatic multi-hole hollow tires according to claim 1, wherein a side of the mold core facing the mold frame is provided with a boss, the boss is inserted into the feeding passageway of the mold frame.

3. The extrusion mold for non-pneumatic multi-hole hollow tires according to claim 1, wherein the number of the plurality of mold blocks is two mold blocks.

4. The extrusion mold for non-pneumatic multi-hole hollow tires according to claim 1, wherein H, the length of the discharge hole is not less than 10 mm.

5. The extrusion mold for non-pneumatic multi-hole hollow tires according to claim 1, wherein a thickness of each thin-wall connection strap is less than 1-2 mm.

* * * * *